United States Patent [19]

Deman et al.

[11] Patent Number: 4,573,209

[45] Date of Patent: Feb. 25, 1986

[54] FIXED STATION OF A RADIOCOMMUNICATIONS SYSTEM WITH FREQUENCY JUMPS AND TWO-WAY TRANSMITTERS

[75] Inventors: Pierre Deman; Henri Butin, both of Paris, France

[73] Assignee: Thomson CSF, Paris, France

[21] Appl. No.: 496,561

[22] Filed: May 20, 1983

[30] Foreign Application Priority Data

May 27, 1982 [FR] France .................. 82 09259

[51] Int. Cl.⁴ ............................................. H04B 1/38
[52] U.S. Cl. ................................. 455/73; 179/2 EB; 370/56; 370/80; 455/54
[58] Field of Search ................. 370/56, 80, 81; 455/7, 455/14, 15, 17, 34, 49, 53, 54, 58, 73, 56, 33; 179/2 EB

[56] References Cited

U.S. PATENT DOCUMENTS 2,941,038  6/1960  Seki ............................... 370/81
3,424,868  1/1969  Saal ............................... 370/81

Primary Examiner—Marc E. Bookbinder
Attorney, Agent, or Firm—Cushman, Darby & Cushman

[57] ABSTRACT

A frequency jump radiocommunications system fixed station in which n receivers and n channels may be connected to p transmitters; p being less than n. A management circuit is provided on each of the n channels to provide signals indicating the active/nonactive state of each channel. A time/frequency law generator is provided on each channel to generate the jumped frequency signals. A general control circuit receives the active/nonactive signals and provides a connection control signal and provides a connection control signal assigning one of the n channels to one of the p transmitters. The general control circuit also generates a transmission authorization signal to authorize the p transmitters to transmit. The connection control signal is received at first and second connection matrices. The first connection matrix connects one of the n channels to one of the p transmitters and the second matrix connects one of the n time frequency law generators to one of the p transmitters, as designated by the connection control signal.

3 Claims, 4 Drawing Figures

FIXED STATION OF A RADIOCOMMUNICATIONS SYSTEM WITH FREQUENCY JUMPS AND TWO-WAY TRANSMITTERS

BACKGROUND OF THE INVENTION

The invention relates to radiocommunications systems ensuring the link between moving stations and one or more fixed stations on frequency jump "channels" and more particularly to the fixed stations of such a system.

In conventional radiocommunications systems, each fixed station has a group of N transmitter-receiver pairs. Each of these pairs is allocated to a communication throughout the duration thereof. The number N of transmitter-receiver pairs in a fixed station is determined as a function of the intensity of the traffic and the maximum permitted loss rate. Thus, for a traffic of 10 erlangs per charged hour, it is conventionally necessary to provide 15 transmitter—receivers to have a 5% loss rate.

In a system where the links are frequency jump links, a frequency jump law can be allocated to each moving station. The laws of the different moving stations in a space-time-frequency continuum are independent, but change values simultaneously. The values of the frequencies in all of the jump laws are chosen within the same group of predetermined frequencies. Transmission takes place during a time period at a given frequency, each such period separated from other periods by dead times, thus facilitating frequency changes. On the reception side, the fixed stations must monitor all the communications liable to be transmitted and consequently all the reception subassemblies are indispensable, i.e. 15 receivers in the above example for a 10 erlang traffic flow with a 5% loss rate.

However, on transmission, the fixed station manages all the communications with the moving stations of the cell. However, transmitters are among the most costly elements of the infrastructure necessary for the fixed station.

SUMMARY OF THE INVENTION

The invention relates to a fixed station of a frequency jump radiocommunications system in which the number of transmitters is smaller than the number of receivers, the transmitters being made two-way and allocated solely to those portions of communications during which it is necessary to transmit.

Thus, the invention specifically relates to a fixed station of a frequency jump radiocommunications system, in which transmission takes place during time periods at a given varying by jumps from other periods, and in which the jumps are synchronous for all the transmitters. For a connection with n transmitter-receiver links, n receivers are allocated to the n receiver links and p transmitters are allocated to the n transmitter links, p being lower than n. The station also has a general control circuit receiving n signals and indications of the activity or non-activity states of the transmission links. The n signals are generated by n management circuits associated with n transmission links and supply on the one hand transmission authorization signals to the p transmitters and on the other hand connection control signals. The station also has two connection matrices with n signal inputs, p signal outputs and control inputs receiving the connection control signals. The first connection matrix is for connecting a maximum of p from among the n transmission links to the signal inputs of the p transmitters. The second connection matrix is for establishing the same connections connect a maximum of p from among the n time/frequency law generators associated with the n transmission links to the frequency control inputs of the p transmitters.

BRIEF DESCRIPTION OF THE DRAWINGS

The invention is described in greater detail hereinafter relative to non-limitative embodiments and with reference to the attached drawings, which show.

DETAILED DESCRIPTION OF THE INVENTION

All the transmitters and receivers of the system and in particular all those of the fixed station operate on synchronous jumps between time period at a given frequency, the time periods being separated by dead times. The frequencies used during these periods are determined by the hour and the identification number of the destination subscriber.

Moreover, a feature of telephone links used in such a system is that the mean of the effective transmission times is approximately one quarter of the total duration of the communication, a factor of 2 being linked with the fact that the transmission is bilateral (only one of the two subscribers speaking at once), the other factor 2 being linked with the dead times and silences between words and syllables in a running conversion.

Thus, in the fixed station according to the invention, the transmitters are only used during the time strictly necessary for the transmission of the telephone signal or the procedure signals, i.e. a transmission circuit is no longer reserved for an entire communication, but only for portions thereof. Outside these transmission periods, no signal is transmitted, not even an unmodulated carrier. Thus, the occupation time on transmission for a communication is well below the communication time and a transmitter can be freed between two transmission periods of the same communication. In view of the fact that each transmitter must change frequency for each transmission period, there is no problem in applying frequency change control, linked with the identification number of the destination subscriber, to one or another transmitter by means of common management of all the activity periods of the communications taking place. This makes it possible to allocate portions of communications to two-way transmitters and reduce the number of transmitters necessary in a fixed station for the flow of a given traffic compared with a system having transmitters coupled to receivers and allocated to entire communications.

At peak times, such a system introduces supplementary interruptions into communications, but their effect is negligible compared with the corresponding equipment reduction and are not prejudicial to listening or understanding. Thus, for a fixed station with 15 receivers, if the number of transmitters is reduced to 10, the breaks introduced during the simultaneity period to 15 communications are equivalent to a supplementary intrinsic interference level of 0.36%, the intrinsic interference being due to the fact that the frequencies of two periods can coincide even though they have different frequency jump laws since the frequencies are chosen from the same group. Moreover, like intrinsic interference, as the interruptions take place in whole periods, their effect is less disturbing than distributed errors or faults, even at a lower rate or level.

Figure 1:
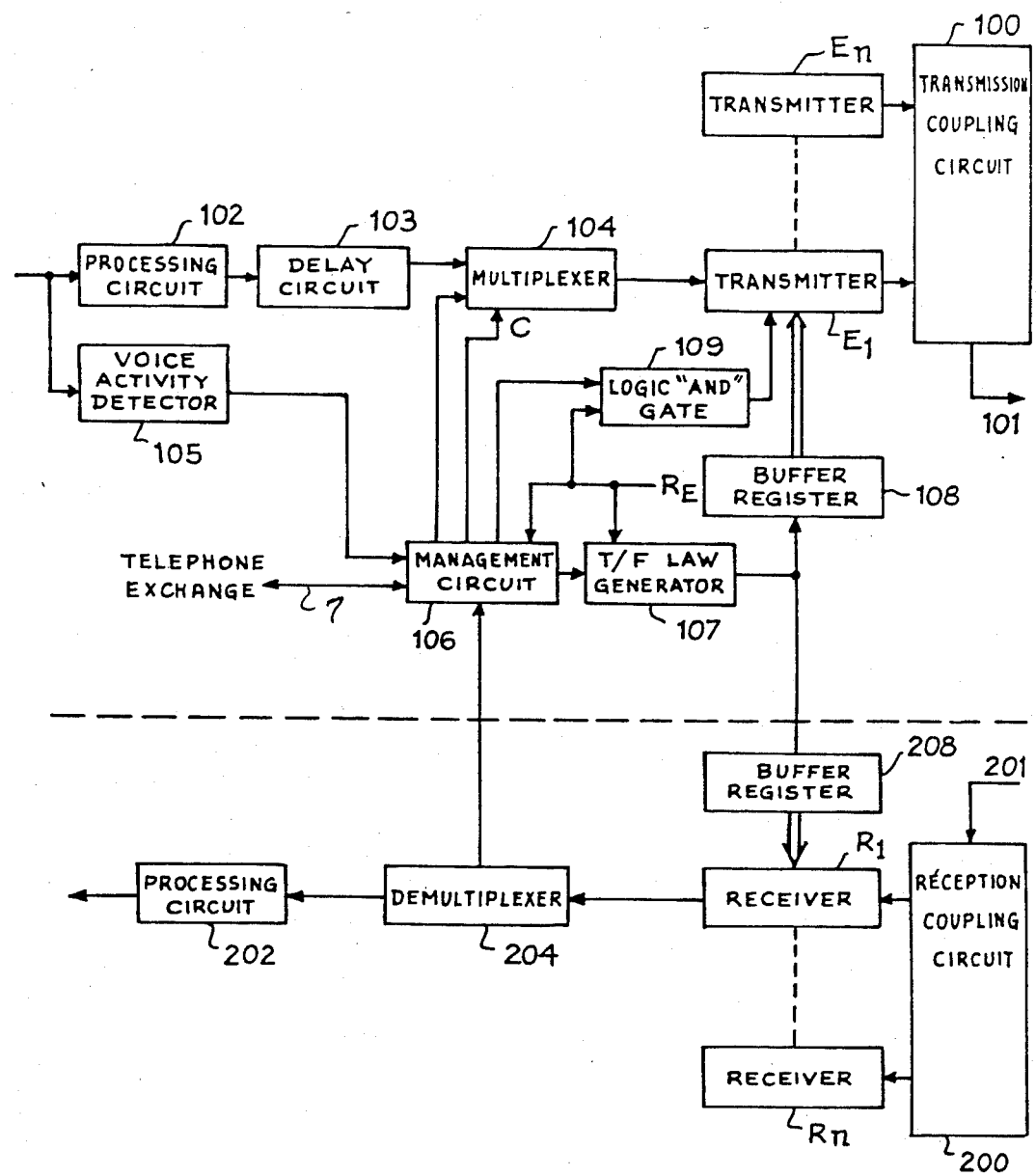
FIG. 1 a prior art embodiment of a fixed station having the same number of transmitters as there are receivers.

FIG. 1 shows a prior art fixed station which, in contrast to the present invention, has the same number of transmitters as receivers in a frequency jump system.

This fixed station comprises n transmitters $E_1 \ldots E_n$ and n receivers $R_1 \ldots R_n$, only the first and nth being shown. The outputs of transmitters $E_i$ (i=1 to n) are connected to the inputs of a transmission coupling circuit 100, whose output 101 is connected to the transmitting antenna. In the same way, in the reception part of the station, the receiving antenna is connected to the inputs of the different receivers, via a reception coupling circuit 200. The transmitters and receivers are combined in pairs such as $E_1R_1 \ldots E_iR_i \ldots E_nR_n$ in fixed manner by a four-wire telephone line formed by a "transmission" pair $TRON_i$ and a "reception" pair $RON_i$, coming from an attached radio telephone channel. Other circuits necessary for the satisfactory operation of the system are associated with each transmitter-receiver pair, but only those corresponding to $E_1R_1$ are shown in FIG. 1.

When a communication is taking place on line 1, with a moving station, the tone, conversation or telephone signal arrives on $TRON_1$ line in analog form MIC or the like and is applied to the input of a processing circuit 102, which converts this signal into an appropriate form for radio transmission. Processing circuit 102 can be e.g. a MIC-DELTA converter or an analog-DELTA converter. In a system in which radio transmission takes place in accordance with a frequency jump law, with a dead time between time periods, the processing circuit 102 also has means for cutting-off and time compressing the binary train resulting from the conversion, in order to adapt it to transmission during these periods. The compressed signals are transmitted to the output of the processing circuit 102 which is connected to the input of a delay circuit 103. The output of the delay circuit is connected to the first input of a multiplexer 104, whose output is connected to the input of the corresponding transmitter $E_1$.

Transmission line $TRON_1$ is also connected to the input of an activity detector circuit 105, which carries out the silence/voice activity or silence/service signal discrimination. The output of the activity detector 105 consequently supplies activity or non-activity information, in the form of a two-state signal, to one of the inputs of a communication management circuit 106. Circuit 106 is also connected to the telephone exchange via a two-way link 7, which permits the information exchanges necessary for establishing, carrying out and ending a communication between the telephone exchange and the communication management circuit. The management circuit also has a timing signal input $R_E$, whose recurrence is the same as that of the transmission periods, the transmission timing binary signal being supplied by a general time base such as a clock, which is not shown in the drawing. This management circuit 106, e.g. a microprocessor, produces the conventional procedure signals (handshake signals, etc.) required for the satisfactory performance of the communication, e.g. a signal to remotely control the power of the moving station. These procedure signals are transmitted to the transmitter via the second input of multiplexer 104. The management circuit 106 also supplies a control signal to the control input C of multiplexer 104 to control the operation of the multiplexer.

In the case of a transmission in accordance with a frequency jump law, a generator 107 which generates frequency jump laws as a function of time, the T/F law, is also associated with the transmitter-receiver pair. For generating this frequency jump law, the generator has an identification signal input connected to the corresponding output of the management circuit, giving the identification information of the corresponding channel at the start of the establishment of the link. This time-frequency law generator also receives the transmission timing binary signal $R_E$. For each pulse start with timing $R_E$, the T/F law generator determines a new frequency range and transmits the corresponding frequency value to the transmitter, via a buffer register 108.

The same transmission timing signal $R_E$ is also connected to the first input of a logic AND gate 109, whose second input receives a signal from the management circuit at zero level, when no activity has been detected by activity detector 105. The output of the logic AND gate 109 is connected to a control input of the transmitter, so as to cut off the transmission of this transmitter during the dead time between periods or when there is no telephone activity or procedure to be transmitted.

In the reception portion of the station, the elements corresponding to those of the transmission portion have been designated by the same reference numerals, increased by 100. Thus, each receiver $R_i$ receives the frequency value calculated at the start of a period of the time-frequency law generator 107, via a buffer register 208. The demodulated signal received by receiver R is applied to the input of a demultiplexer 204, which supplies at its two outputs, the information signal supplied to the input of a processing circuit 202, and procedure signals applies to a supplementary input of a communication management circuit 106. The processing circuit 202 has the reverse function of processing circuit 102 and retransmits the telephone signal in a form usable by the reception pair $RON_1$.

Figure 2:
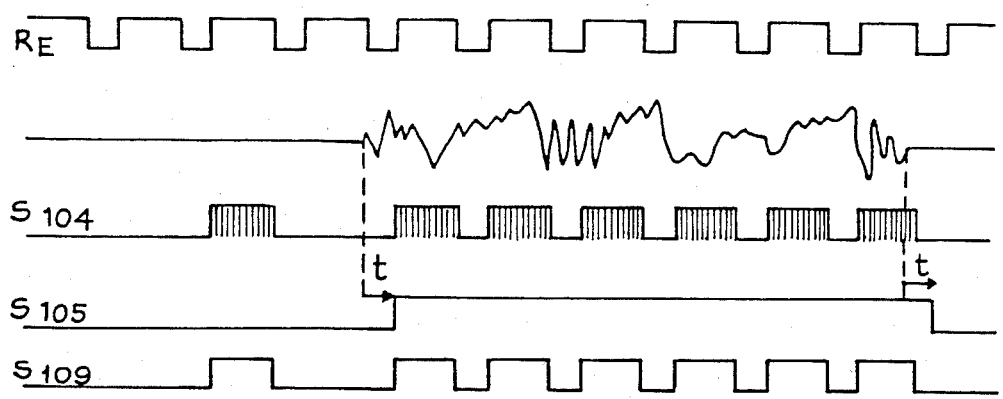
FIG. 2 an explanatory signal diagram of the FIG. 1 station.

FIG. 2 shows the signal diagram associated with the operation of the circuit described relative to FIG. 1 in the case of transmission. The first three signals shown are the transmission timing signal $R_E$, the analog signal $TRON_1$, and output signal of multiplexer 104, $S_{104}$ which has, for example, a first transmission period during which is transmitted a procedure signal and then transmission periods during which are transmitted the compressed analog signal in a form adapted to its transmission. The output signal of activity detector $S_{105}$ is staggered with respect to telephone signal $TRON_1$ by the time t necessary for detection. Signal $S_{109}$ is the transmission authorization signal transmitted by logic gate 109 to the corresponding transmitter.

Figure 3:
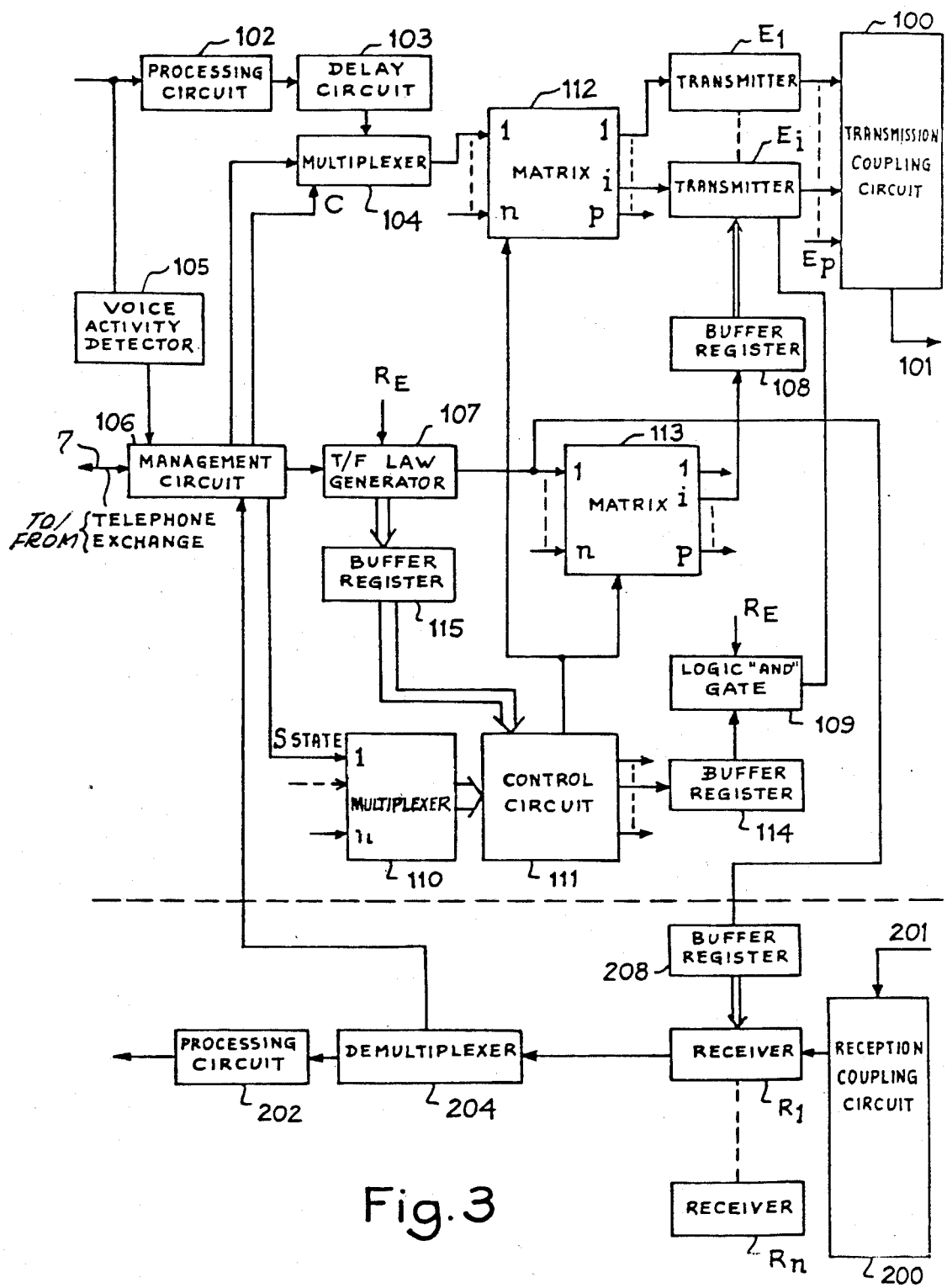
FIG. 3 an embodiment of the fixed station according to the invention.

FIG. 3 shows an embodiment of a fixed station according to the invention. The same elements as in FIG. 1 are designated by the same references. In this system, there are the same number of four-wire telephone lines as in the preceding system, i.e. n transmission pairs $TRON_1 \ldots TRON_n$ and n reception pairs $RON_1 \ldots R_n$. In the same way, there are the same number of receivers and associated circuits as there are telephone lines, the reception part of this system being the same as the reception part of the system described with reference to FIG. 1.

However, in the transmission part, the generation of the signals to be transmitted associated with each telephone line is like that of the system described relative to FIG. 1, but the number of transmitters is smaller than the number of receivers. Moreover, the system has connection matrices for connecting the outputs of the telephone signal generating circuits to the transmitters and control circuits associated with said connection matrices.

In a more detailed manner, the transmission part has p transmitters $E_1 \ldots E_i \ldots E_p$, whose outputs are connected to the inputs of the transmission coupling circuit 100, output 101 of said circuit being connected to the transmitting antenna. The telephone line, e.g. that of index 1 associated with $TRON_1$, is connected to processing circuit 102 and to activity detector 105. The output of processing circuit 102 is connected to the output of multiplexer 104, via a delay circuit 103 and the first input of said multiplexer 104. The output of activity detector 105 is connected to an input of management circuit 106, said circuit being connected to the telephone exchange by a bilateral link 7. As hereinbefore, the mangement circuit generates procedure signals which are applied to the second input of multiplexer 104, the control signal applied to the input C of the multiplexer, the identification information of the transmitter channel applied to the frequency jump law generator 107 and the control signal indicating when there is either telephone activity or procedure to be transmitted for the corresponding channel. Contrary to what has been described hereinbefore, the latter signal is no longer directly applied to a logic gate used for controlling a transmitter, but is instead applied to the input of a multiplexer which groups all the n links carrying the telephone activity information. The output of this multiplexer is connected to an input of a general transmitter control circuit 111, which is advantageously a microprocessor and common to the complete station. The grouping of the links carrying activity information on multiplexer 110 intended for control circuit 111 serves to notify said control circuit when there is an activity change in the configuration of the links of index 1 to n. In another embodiment of this system, these links can be grouped on an interruption system of the microprocessor.

The outputs of the n multiplexers, such as 104, are connected to the n inputs of a connection matrix 112 having p outputs, p being lower than n. In the same way, the outputs of the n time-frequency law generators 107 are connected to the n inputs of a connection matrix 113 having p outputs. The p outputs of this matrix 113 are connected to the inputs of p buffer registers 108, whose outputs are connected to the frequency control inputs of the p transmitters $E_1$ to $E_p$. It has been assumed in FIG. 3 that the signal to be transmitted applied to line $TRON_1$ was transmitted by the transmitter of index i, $E_i$. Matrices 112 and 113 can be based on a random technology, but must be sufficiently fast. The transmission control of transmitter $E_i$ is a signal from control circuit 111, via a buffer register 114 and a logic AND gate 109, the second input of gate 109 receiving, as hereinbefore, the transmission timing signal $R_E$. Control circuit 111 also supplies a control signal to matrices 112, 113, the connections established by these matrices being the same at a given time.

The control circuit 111, e.g. a microprocessor as hereinbefore, has in its memory the list L of transmitters transmitting (active transmitters) and the list L' of non-transmitting transmitters inactive transmitters). For each transmitting transmitter, the identification number of the corresponding TRON line is also stored. The updating of these lists is carried out by multiplexer 110. When the activity/nonactivity state signal associated with the transmission line $TRON_j$ passes from state 1 to state 0, (i.e. the corresponding line stops its activity, either by a pause, or by an end of procedure), control circuit 111 deactivates the transmitters via buffer register 114 and logic gate 109 and also updates lists L and L' to reflect the inactive state of the transmitter.

In the samey way, when the activity/nonactivity state signal of the link of index j passes from state 0 to state 1 and characterizes the start of activity of the link of index j, the control circuit 111 activates a transmitter and assigns it to the active link. The control circuit 111 does this by selecting a transmitter of index i from the list of inactive transmitters L' and passig it to list L of active transmitters by simultaneously transmitting the necessary instructions to the connection matrices 112, 113 and to the buffer registers 114.

Thus, when an open transmission line is detected by management circuit 106, an active state signal is sent to multiplexer 110 which commands control circuit 111 to choose a transmitter from the inactive transmitter list L' and assign it to the active transmitter list L. The chosen transmitter is then connected to the open line via connection matrix 112, and to the appropriate T/F law generator via connection matrix 113.

Thus, the assignment of transmitters is flexible and a transmitter may be allocated to each of the links requiring a transmission as a function of the activity periods of these different links.

The assignment of the frequency of the following transmission period is carried out in the T/F law generator; during the transmission period taking place, and the frequency synthesizer of the transmitter allocated to the communication is positioned during the dead time between two successive periods.

An improvement to the fixed station according to the invention consists of associating with eac of the T/F law generators, such as 107, a buffer register 115, into which is transferred the identification number of the frequency bond assigned on the basis of the hourly reference and the identification number of the destination subscriber, said transfer taking place as soon as the frequency assignment has been made. These n buffer registers, such as 115, are connected to the general control circuit 111. At the end of a transmission period, control circuit 111 systematically scans all the registers 115 and updates a list L" which lists are the identification numbers of frequencies to be transmitted in the following period by the active transmitters (Maximum of p).

A test is carried out in the control circuit 111 to check whether at the fixed station, two or more transmissions at the same frequency are requested during one transmission period. If a single frequency is requested twice for the same period, only one of the requested transmissions is enabled by the control circuit and only this transmission is carried out during following transmission period.

This improvement makes it possible to reduce the intrinsic interference by inserting, in the case of one of the conflicting transmissions, a silient transmission period, which makes it possible to transmit the other transmission under good conditions.

Figure 4:
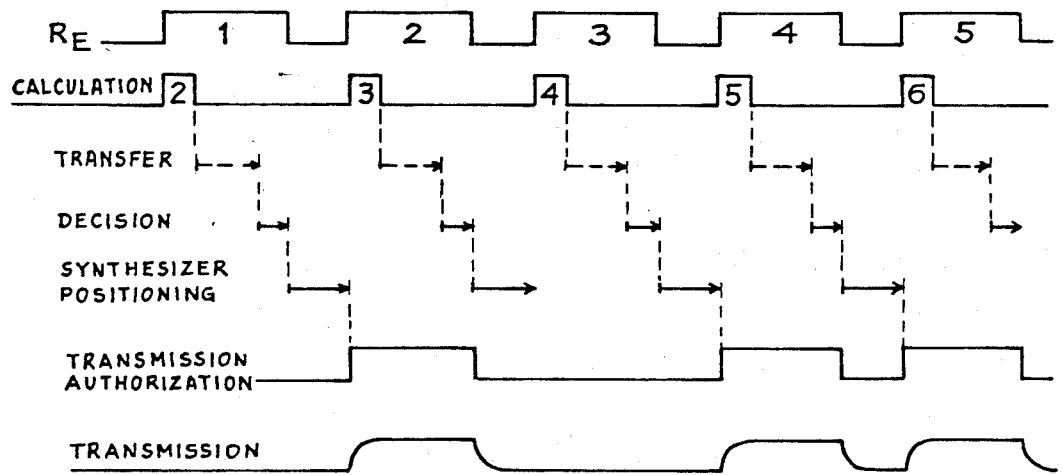
FIG. 4 an explanatory signal diagram of the FIG. 3 station.

FIG. 4 is an explanatory signal diagram showing the different stages of the operation of the management circuit for this improvement. The signals shown are the timing signal $R_E$, and a signal characterizing the frequency assignment periods for assigning a frequency to the following transmission period. Transfer of the assignment into buffer registers 115 takes place during each active transmission period in such a way that the synthesizers of the transmitters can be positioned during the dead time between transmission periods. If there are conflicting requests for the same frequency, a decision is made at the end of the active transmissin period to provide one of the transmitters with a silent transmission period. Thus, for a given transmitter, a transmission period (period 3 in the drawing) can be replaced with a silent transmission period, which leads to the suppression of the corresponding range in the transmission authorization signal from the control circuit and transferred to the corresponding transmitter. The unprevented ranges are via buffer register 114 logic gate 109. The final signal represents the transmission by the corresponding transmitter.

What is claimed is:

1. A fixed station of a frequency jump radiocommunications system in which transmissions take place on frequency ranges varying by synchronous jumps, comprising:
    reception means for receiving signals;
    n receivers coupled to said reception means;
    n communications channels coupled to said n receivers, respectively;
    p transmitters, each one having a connection input through which said one transmitter may be connected to said n channels, and each one having a frequency control input for transmitting on said frequency ranges varying by jumps, p being less than n;
    n management circuits, each one of which correspond to one of said n channels, respectively, each said management circuit generating a signal indicative of an activity/nonactivity state of said corresponding channel;
    n time/frequency law generators, each one of which corresponds to one of said n channels, respectively, each said time/frequency law generator providing said frequency ranges varying by jumps;
    general control means for receiving said activity/nonactivity signals from said n management circuits and providing a connection control signal which assigns one of said n channels to one of said p transmitters, and for providing transmission authorization signals to said p transmitters to authorize said transmission;
    first connection matrix means connected between said n channels and said p transmitters, for receiving said connection control signal and connecting one of said n channels to the connection input of one of said p transmitters;
    second control matrix means, connected between said n time/frequency law generators and said p transmitters, for receiving said connection control signal and connecting one of said time/frequency law generators to the frequency control input of one of said p transmitters.

2. A station according to claim 1 wherein each one of said n time/frequency law generators generates a signal identifying particular frequency ranges corresponding to a given transmission, and wherein said general control means receives said identification signals from said n time/frequency law generators and prevents simultaneous transmission of a same frequency range by more than one of said p transmitters.

3. A station according to claim 1, wherein said general control means only controls connection modifications at a start and finish of transmission periods.

* * * * *